United States Patent
Nielsen et al.

(10) Patent No.: US 7,700,020 B2
(45) Date of Patent: *Apr. 20, 2010

(54) METHODS FOR PRODUCING AN OBJECT THROUGH SOLID FREEFORM FABRICATION

(75) Inventors: Jeffrey A. Nielsen, Corvallis, OR (US); Vladek Kasperchik, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 737 days.

This patent is subject to a terminal disclaimer.

(21) Appl. No.: 10/340,474

(22) Filed: Jan. 9, 2003

(65) Prior Publication Data

US 2004/0135276 A1 Jul. 15, 2004

(51) Int. Cl.
*B29C 41/02* (2006.01)
(52) U.S. Cl. ........................................ 264/113
(58) Field of Classification Search ............... 264/113, 264/255, 308; 347/1, 54
See application file for complete search history.

(56) References Cited

U.S. PATENT DOCUMENTS

| | | | |
|---|---|---|---|
| 4,513,299 A * | 4/1985 | Lee et al. ..................... 347/15 |
| 5,124,716 A * | 6/1992 | Roy et al. ..................... 347/11 |
| 5,510,066 A * | 4/1996 | Fink et al. ............... 264/255 X |
| 5,902,441 A | 5/1999 | Bredt et al. |
| 5,976,339 A | 11/1999 | Andre, Sr. |
| 5,997,681 A | 12/1999 | Kinizie |
| 6,136,132 A | 10/2000 | Kinizie |
| 6,146,567 A | 11/2000 | Sach et al. |
| 6,149,072 A | 11/2000 | Tseng |
| 6,164,850 A | 12/2000 | Speakman |
| 6,270,335 B2 | 8/2001 | Leyden et al. |
| 6,402,403 B1 | 6/2002 | Speakman |
| 6,405,095 B1 | 6/2002 | Jang et al. |
| 6,416,850 B1 | 7/2002 | Bredt et al. |
| 6,471,800 B2 | 10/2002 | Jang et al. |
| 6,476,122 B1 | 11/2002 | Leyden |
| 2003/0099708 A1* | 5/2003 | Rowe et al. .................. 424/469 |

FOREIGN PATENT DOCUMENTS

| | | |
|---|---|---|
| DE | 19937 770 A1 | 2/2001 |
| EP | 1264679 A2 * | 12/2002 |
| JP | 2003274536 | 9/2003 |
| WO | WO-03/041875 A1 * | 5/2003 |

* cited by examiner

*Primary Examiner*—Leo B Tentoni

(57) ABSTRACT

A method of producing an object through solid freeform fabrication preferably includes ejecting drops of different volumes to form a layer of the object. The drops may be binder drops ejected into a build material or may include the build material used to form the object.

16 Claims, 4 Drawing Sheets

METHODS FOR PRODUCING AN OBJECT THROUGH SOLID FREEFORM FABRICATION

BACKGROUND

Solid freeform fabrication is a process for manufacturing three-dimensional objects including final products, prototype parts and working tools. Solid freeform fabrication is an additive process in which an object, which is described by electronic data, is automatically built layer by layer from base materials. Several principal forms of solid freeform fabrication are performed using inkjet printing techniques.

In one type of solid freeform fabrication system that uses printing techniques, a number of printed planar layers are combined together to form a planar or non-planar, three-dimensional object. Parts are fabricated by "printing" or ejecting a binder onto a flat bed of powder or slurry brick. Where the binder is ejected, the powder is solidified into a cross section of the object being formed. This printing is performed layer-by-layer, with each layer representing another cross section of the final desired product. Adjacent printed layers are adhered to one another in predetermined patterns to build up the desired product.

In addition to selectively forming each layer of the desired object from the powder in the fabrication chamber, the system can also print a color or color pattern on each layer of the object. Often, the binder is colored such that the functions of binding and coloring are integrated.

For example, inkjet printing technology can be employed in which a number of differently colored inks are selectively ejected from the nozzles of a print head and blended on the build material, e.g., the powder layer, to provide a full spectrum of colors. On each individual layer, conventional two-dimensional multi-pass printing techniques and half-toning algorithms can be used to hide printing defects and achieve a broad range of desired color hues.

In previous solid freeform fabrication systems that use printing technology to add binder to powder, generally the drops of binder are relatively large in order to make the binder flux as high as possible. Binder flux is a measure of how much binder is used in a given period of time. A higher binder flux results in a higher fabrication speed for the solid freeform fabrication system.

However, using large drops of binder makes it difficult or impossible to create small features and smooth surfaces. An object being fabricated may be thought of as being made up of voxels, three-dimensional blocks that each correspond to a drop of binder. The smallest voxel possible is limited by either the powder size or the binder drop size. Because current solid freeform fabrication tools use large drops, the limiting factor on voxel size is usually the binder drop volume.

Therefore, to create objects with fine details, previous solid freeform fabrication systems use small binder drops throughout the entire object. While using small drops may facilitate adding detail to the object and providing a smoother surface finish, the reduction in ink/binder flux results in a slower throughput for the machine and longer fabrication times.

SUMMARY

In one of many possible embodiments, a method of producing an object through solid freeform fabrication preferably includes ejecting drops of different volumes to form a layer of the object.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

Throughout the drawings, identical reference numbers designate similar, but not necessarily identical, elements.

DETAILED DESCRIPTION

A method and system are described herein that include techniques, preferably printing techniques, for creating objects in a solid freeform fabrication system. This method and system described include the recognition that objects can be created with a more desirable surface finish by using variable binder and/or ink drop volumes. The method and system described also include using variable drop volumes to produce finer features in the product being produced by reducing or minimizing the terracing between layers of the product.

As used throughout this specification, and in the appended claims, the terms "variable drop size," "variable drop volume" and similar terms refer to the use of drops of two or more different volumes, where the volume includes binder, ink, or, preferably, a combination of binder and ink, for building an object by solid freeform fabrication. Further, the use of the terms "small drop" and "large drop" are used to distinguish relative volumes of binder and/or ink in a drop and do not refer to any specific quantitative value. The drop volume sizes used to bind and/or color a layer of build material to fabricate an object will vary within the same object.

Further, as used in this specification and the appended claims, the term "ink" is used broadly to mean any substance ejected by a print head to mark and/or color an object being fabricated. Consequently, the term "ink" includes, but is not limited to, ink, printing fluid, toner, colorant, etc.

Figure 1:
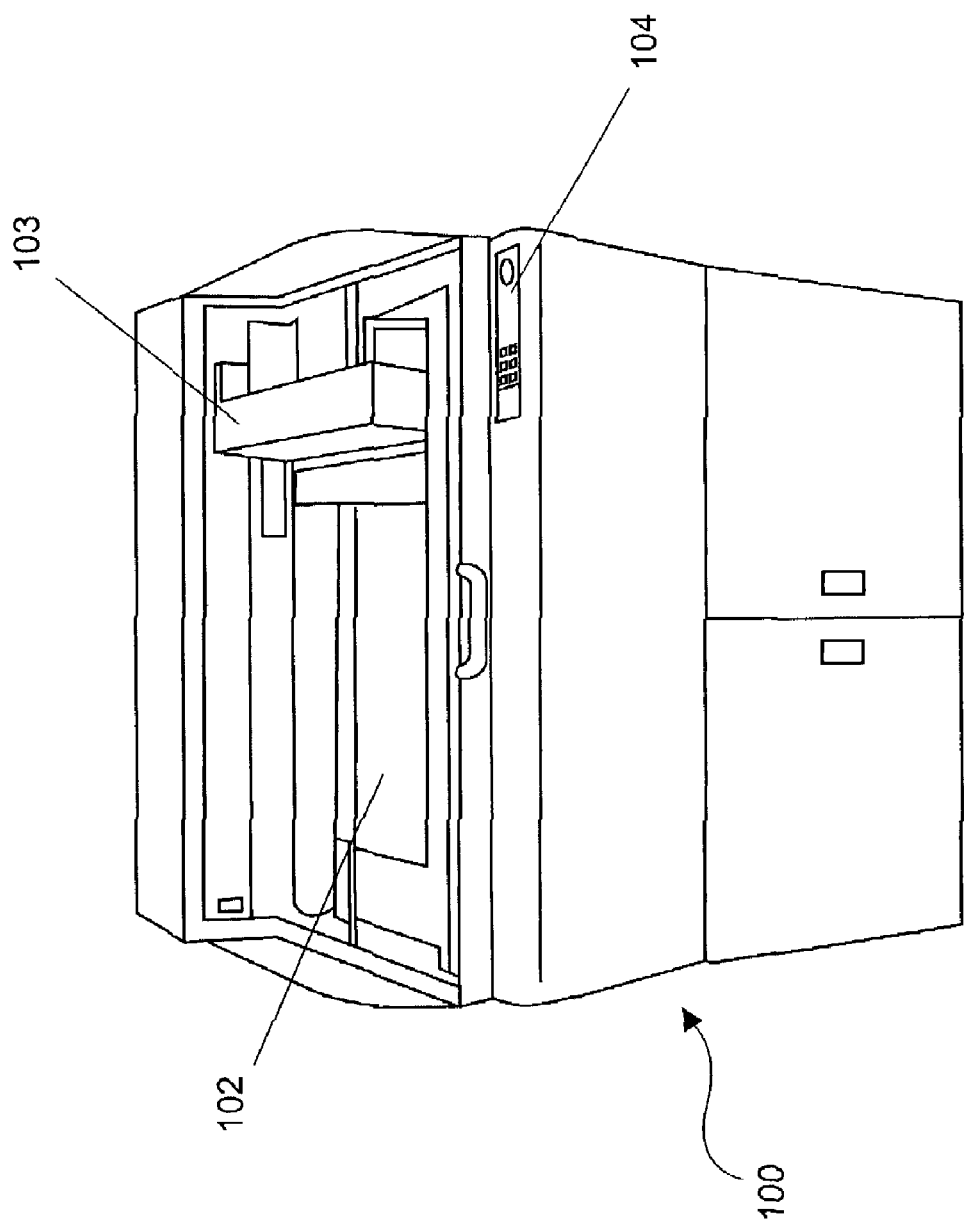
FIG. 1 illustrates a solid freeform fabrication system that uses a printing process to fabricate desired products. An embodiment of the present invention can be implemented in the system illustrated in FIG. 1.

FIG. 1 illustrates one solid freeform fabrication system that uses printing technology. In the solid freeform fabrication system (100) of FIG. 1, a powdery material is used to form each individual layer of the desired product. To do this, a measured quantity of powder is first provided from a supply chamber. A roller, preferably incorporated into a moving stage (103), then distributes and compresses the powder at the top of a fabrication chamber (102) to a desired thickness.

The moving stage (103) also preferably includes a print head that deposits adhesive or binder selectively onto the powder in the fabrication chamber (102) in a two dimensional pattern. This two dimensional pattern is a cross section of the desired product. The adhesive or binder may be colored with ink, toner, or other materials to provide a desired color or color pattern for this particular cross section of the desired product.

The powder becomes bonded in the areas where the adhesive is deposited, thereby forming a layer of the desired product. The process is repeated with a new layer of powder being applied over the top of the previous layer in the fabrication chamber (102). The next cross section of the desired product is then printed with adhesive or binder into the new powder layer. The adhesive also serves to bind the adjacent or successive layers of the desired product together.

This process continues until the entire object is formed within the powder bed in the fabrication chamber (102). The extra powder that is not bonded by the adhesive is brushed away leaving the base or "green" object. A user interface or control panel (104) is provided to allow the user to control the fabrication process.

Such a printing process offers the advantages of speedy fabrication and low build materials cost. It is considered one of the fastest solid freeform fabrication methods, and can produce products in a variety of colors.

The print head of the moving stage (103) preferably includes ink-jet technology for ejecting binder and/or colorant into the layers of the build powder. Using inkjet technology, the print head ejects drops of ink and/or binder in a selective pattern to create and color the object being fabricated.

However, instead of using a single volume size of binder and/or ink drops on each individual layer of the object being fabricated, the volume of the drops may vary as needed to produce a smoother surface finish or to produce finer features in the object being fabricated. Consequently, as will be demonstrated, the variation in drop volumes may be particularly useful at surfaces or contours of the object being fabricated, as well as at terraced surfaces.

As used herein, the term "terrace" or "terracing" are used broadly to mean changes or steps in height. Therefore, a "terrace" includes, but is not limited to, vertical or sloping sides, curves, contours, edges, changes in elevation, etc. within the object being fabricated.

The concept of a variable drop volume is advantageous because it facilitates smoother contours and surfaces and minimizes terrace sizes. Smaller drops can be used during the formation of contours, terraces, etc. allowing those feature to be formed from smaller increments of build material corresponding to the smaller drop size. Accordingly, the terrace steps of complex three-dimensional objects are no longer limited to being formed in larger increments (voxels) corresponding to large drop sizes.

As noted above, large drop sizes are used in solid freeform fabrication to facilitate a high flux for the binder material and/or ink being used. A high binder flux increases the speed at which an object can be fabricated. The method and system disclosed herein retain the advantages of speedy fabrication with the use of large drop sizes, while adding the ability to create smoother surface finishes and more precise surface features by also using small drop sizes.

Figure 2A:
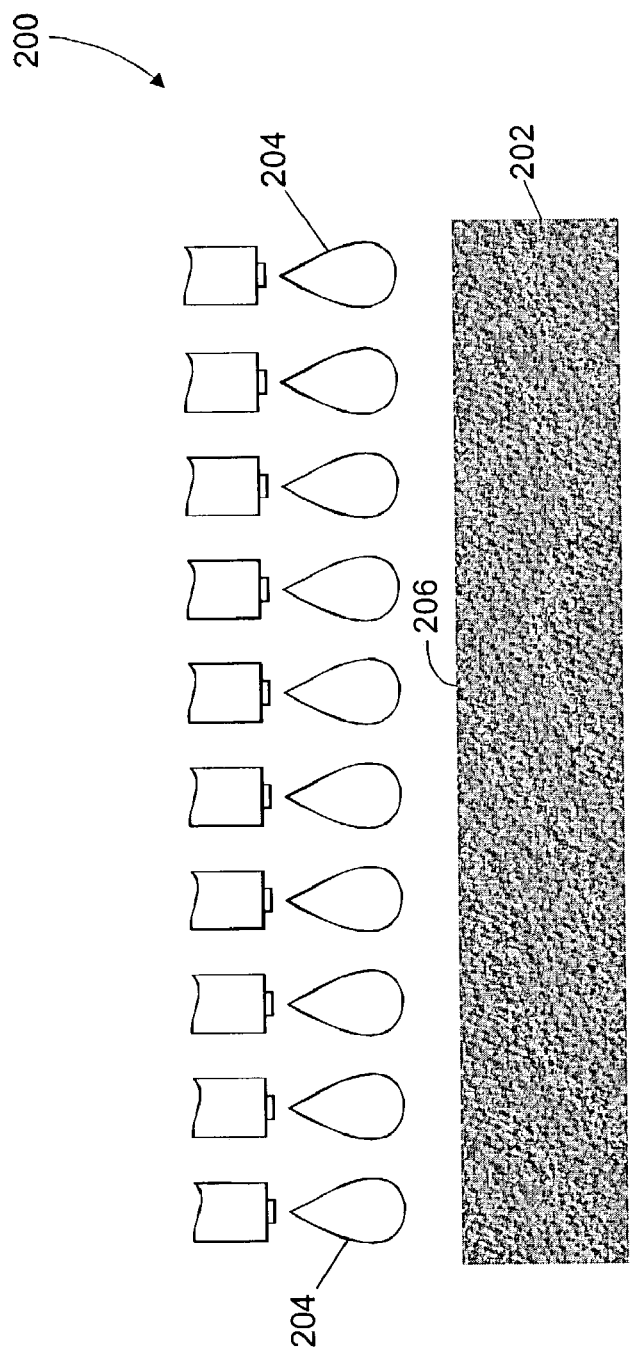
FIG. 2a illustrates an object being fabricated with a single volume drop size, with the single volume drops shown prior to contact with a build material.

FIG. 2a illustrates a cross section of a generic object (200) being fabricated through solid freeform fabrication that uses printing techniques. The cross section shown in FIG. 2a could be for any object and could be a cylinder, a plane, a sphere, or any other shape. As will be appreciated, this illustrated cross section is only for purposes of illustration. An object of any type or shape could be produced using the method and system described herein.

The generic object (200) is created from a layer of build material, for example a layer of powder (202). Portions of the layer of powder (202) that will form part of the generic object (200) are fused together by a binder or adhesive, preferably a colored binder or adhesive. As shown in FIG. 2a, the binder is ejected as a plurality or set of large volume drops (204). The set of large volume drops (204) is ejected into a surface (206) of the layer of powder (202).

Figure 2B:
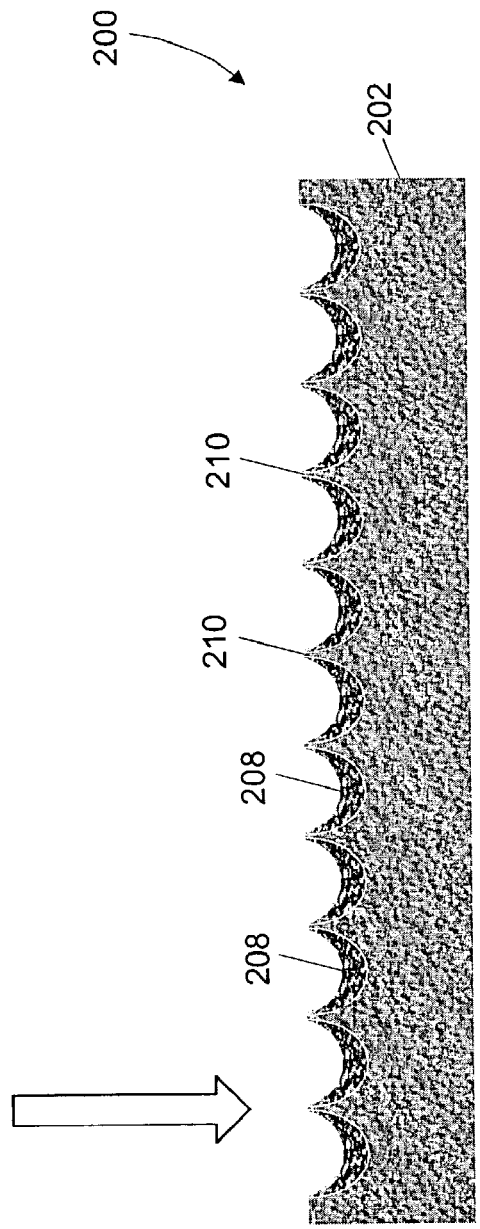
FIG. 2b illustrates the object being fabricated in FIG. 2a, after the single volume drops have reached the build material.

As shown in FIG. 2b, when the large volume drops (204) impact the surface (206, FIG. 2a) of the layer of powder (202), a series of craters (208) corresponding to the large volume drops (204) is formed. Each of the craters (208) typically has relatively high walls (210) associated with it. The large craters (208) and high walls (210) result in a rough surface finish that is undesirable for many fabrication applications. However, the large volume drops (204) facilitate faster fabrication as fewer binder drops need to be ejected across the surface (206, FIG. 2a).

Figure 3A:
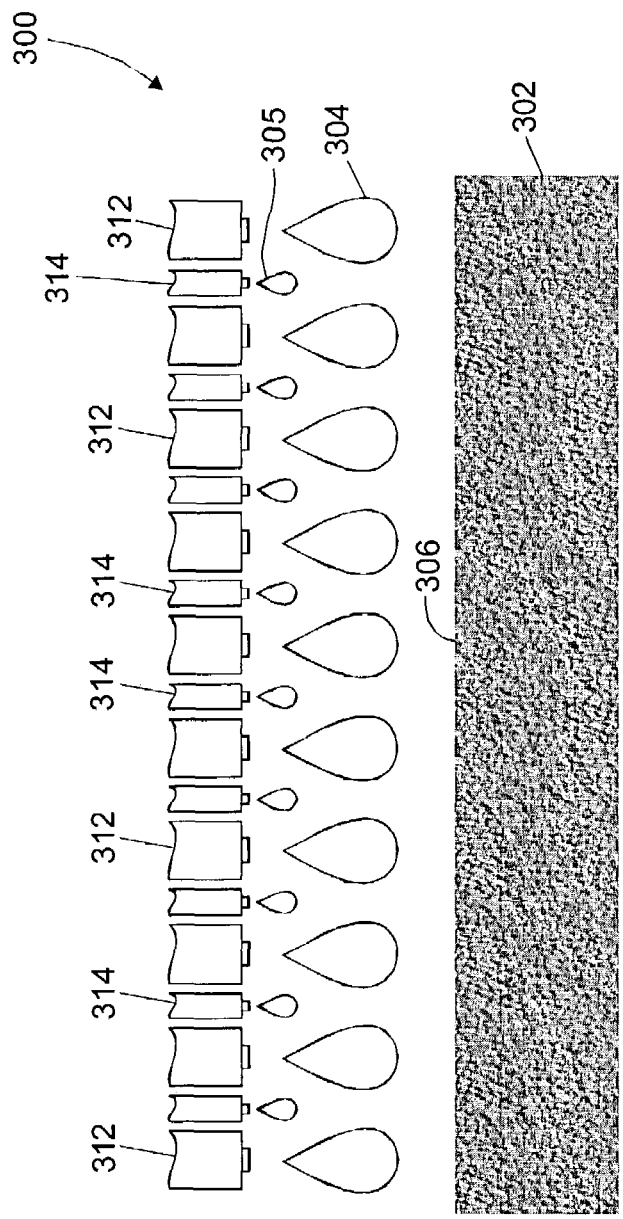
FIG. 3a illustrates an object being fabricated with variable volume drop sizes according to an embodiment of the present invention. The object and variable volume drop sizes are shown prior to contact between the drops and a build material.

Therefore, in order to maintain speedy fabrication and also reduce surface roughness, variable size drop volumes are preferably applied to a build material. FIG. 3a illustrates a cross section of another generic object (300) being fabricated through solid freeform fabrication using printing techniques. The cross section shown in FIG. 3a can also be for any object and could be a cylinder, a plane, a sphere, or any other shape. This illustrated cross section is only for purposes of illustration. The method and system described herein can be applied to an object with any type or shape of cross section.

The object (300) is also fabricated from a build material. According to the present embodiment, the building material is a powder layer (302). Shown adjacent to a surface (306) of the power layer (302) are drops of binder and/or ink of at least two different volumes. The variable drop volumes shown include a first set of large drops (304) interspersed with a second set of small drops (305).

The spacing between large drops (304) and small drops (305) need not be equal, but it can be. In some embodiments, the large drop volumes (304) range from about twenty to about fifty pl (pico-liters). However, this range may sometimes increase from about ten to about two hundred pl in other embodiments. Further, in some embodiments the small drop volumes (305) may range from about five to about twenty pl. The range of size for the small drop volumes (305) may also range in some embodiments from about one to about fifty pl.

However, the small and large drop volumes (304 and 305) are not limited to any particular volume, only that the small drop volume (305) is less than the large drop volume (304). It will be appreciated that other various drop sizes may also be interspersed with the large and small drops (304 and 305) and that the embodiments are not limited to only two drop volume sizes.

Inkjet printing technology provides print heads that can eject selectively sized drops. Any such technology that allows for control over the volume of a drop ejected can be used. For example, inkjet print heads typically use thermal or piezoelectric elements to eject a drop of ink from a chamber. The size of the drop expelled can be controlled in a number of ways including controlling the size of the chamber from which the drop is ejected and controlling the heat or pressure used to eject the drop.

The large volume drops (304) may be ejected from a separate set of ink jet nozzles (312) or other ejection devices. The first set of ink jet nozzles (312) may eject binder and/or ink of a single color (such as clear, white, or another color). Where color fabrication is desired, there may be separate sets of ink jet nozzles that eject ink and/or binder in a variety of colors (generally cyan, magenta, yellow, black, clear, white, or some combination thereof). In some embodiments, the ink jet nozzles for producing the large drops (304) may be formed in a separate print head from the nozzles that produce the small drops (305). In various embodiments, the print head with the nozzles (312 and/or 314) preferably moves over the build material selectively ejecting the binder and/or ink in a selected pattern.

Similarly, each of the small volume drops (305) may be ejected from a nozzle (314) on the same or a separate print head. If the large drop nozzles (314) and the small drop nozzles (312) are provided on different print heads, the print heads must be moved such that the small drops (305) can be placed on the surface (306) between impact locations for the large drops (304). Preferably, the nozzles (314) for the large drops and the nozzles (312) for the small drops are interspersed in a single print head as shown in FIG. 3a.

Alternatively, both the large and small volume drops (304 and 305) may be ejected from a single print head with nozzles capable of selectively producing drops of varying sizes. For example, a piezo drop-on-demand (PIJ) printhead is commercially available and can eject different drop sizes from a single orifice.

In some embodiments, each of the ink jet nozzles (314) for the small drops ejects only a clear binder or adhesive, so that the color of the object (300) fabricated is only influenced by the large drops (304). However, other embodiments of the present invention include ink in both the large (304) and small (305) drops.

Figure 3B:
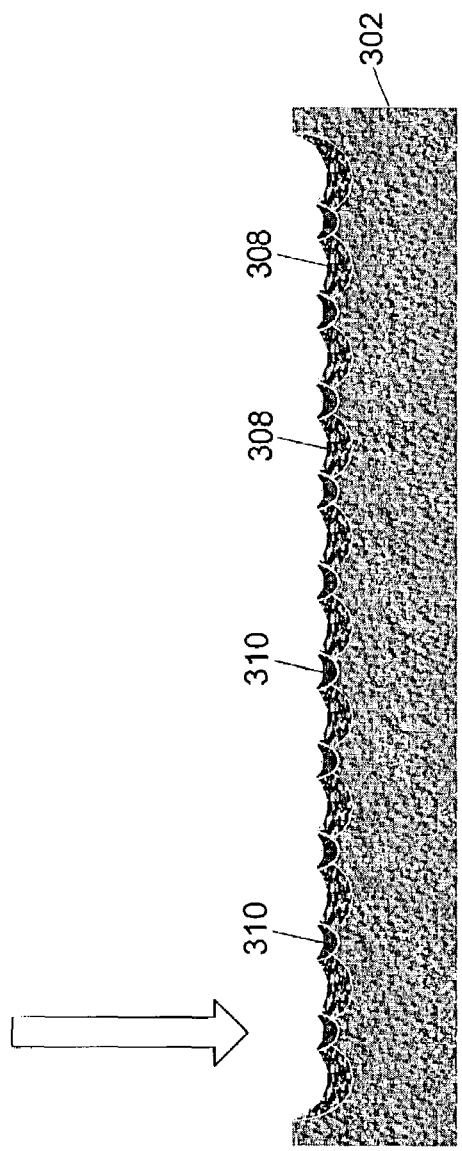
FIG. 3b illustrates the object being fabricated in FIG. 3a, after the variable volume drops have reached the build material.

As shown in FIG. 3b, when the small volume drops (305, FIG. 3a) are interspersed with the large volume drops (304, FIG. 3a) and impact the surface (306, FIG. 3a) of the layer of powder (302), corresponding craters (308) created by the large volume drops (304, FIG. 3a) have much lower walls (310) than the high walls (210, FIG. 2b) formed by using only large volume drops (204, FIG. 2a). It is preferable to eject the small drops (305) simultaneously with or subsequent to ejection of the large drops (304) so that the small drops (305) can impact and reduce the walls (310) that form between large drop craters (308).

Consequently, the otherwise high walls (210), shown in FIG. 2b, are reduced by interspersing the small volume drops (305) between the large volume drops (304). According to the embodiment of FIGS. 3a-b, the small volume drops (305) are precisely targeted to areas of the surface (306) that are between the large volume drops (304). Because the lower walls (310) are much less pronounced than the high walls (210, FIG. 2b) when the small volume drops are added, a much smoother surface finish is created.

In some embodiments, the interspersion of various sized drops of binder and/or ink is only performed at outer contours or surfaces of the object (300), and/or the edges of each layer (302). As the bulk volume of the object (300) will be interior and inaccessible, it is not necessary to smooth each individual interior layer (302). Therefore, preferably only the outer contours and/or edges of the object (300) are formed using the smaller volume drops (305).

However, as many layers (302) as desired may be smoothed by applying variable drop volumes on the surface (306) when those layers are being formed. In some embodiments, only the outer one to five layers are smoothed with variable drop volumes. In other embodiments with more translucent material sets, the outer one to twenty layers or more may be smoothed with variable drop volumes.

Figure 4A:
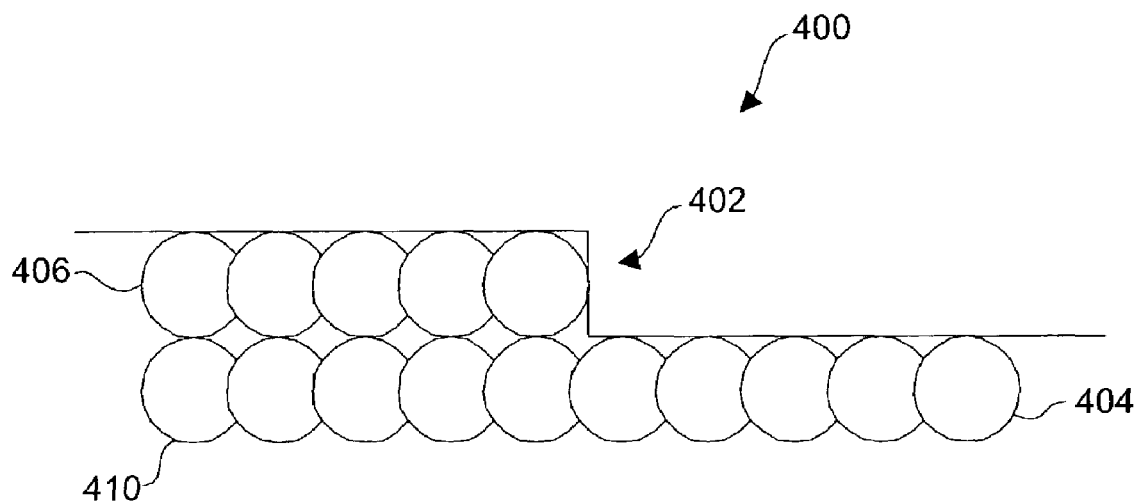
FIG. 4a illustrates a two-layer terrace of an object being fabricated with a single volume drop size according to an embodiment of the present invention.

In addition to facilitating a smoother surface finish on an object produced by solid freeform fabrication, the embodiments described herein facilitate reducing, minimizing, and more precisely controlling terraced portions of an object created by solid freeform fabrication. Consequently, finer surface features can be created. The use of variable drop sizes advantageously allows more precise fabrication on complex three-dimensional surfaces and surface features Referring to FIG. 4a, a generic terraced object (400) is shown according to conventional solid freeform fabrication. A terrace or step (402) between first and second layers (404 and 406) is limited to the increment corresponding to a single large volume drop (410).

Figure 4B:
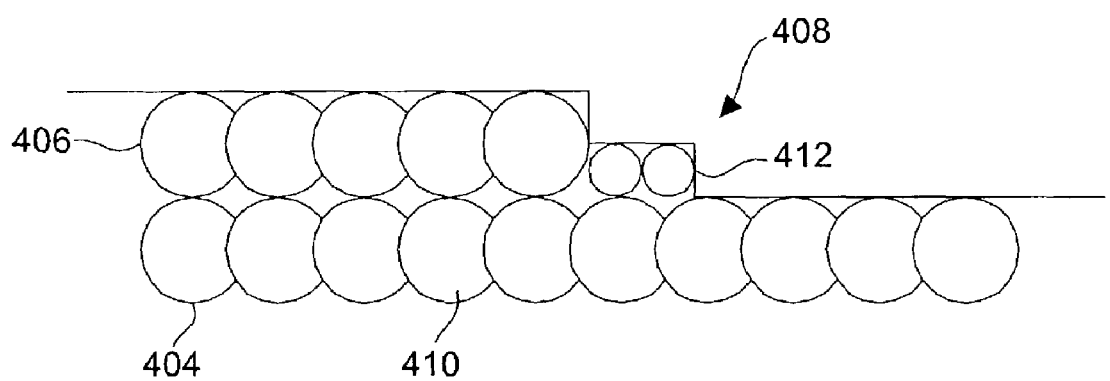
FIG. 4b illustrates a two-layer terrace of an object being fabricated with variable volume drop sizes according to an embodiment of the present invention.

However, referring to FIG. 4b, the contour of the terrace (408) can be made much more smooth by the application of variable drop volumes to the build material according to the method and system described herein. As shown in the figure, small drops (412) of binder and/or ink may be ejected along transitions between layers (such as the first and second layers (404 and 406)) to create a smoother and more gradual terracing step (408) than is possible using large volume drops (410) alone.

By adding an intermediate step or steps (408) created by smaller binder and/or ink drop volumes (412), terracing becomes less jagged and noticeable, if that is the desired effect. Sharper level transitions, if desired, can still be formed by using the larger drop volumes exclusively.

The preceding description has been presented only to illustrate and describe the invention. It is not intended to be exhaustive or to limit the invention to any precise form disclosed. Many modifications and variations are possible in light of the above teaching.

For example, in the foregoing, the described embodiments have been described as implemented in a powder-based or slurry brick solid freeform fabrication system. However, the principles disclosed herein are applicable to more than just the powder-based solid freeform fabrication systems.

In particular, several solid freeform fabrication systems use ink-jet heads to eject a build material, such as a polymer or photo-prepolymer. Thus, these ink-jet systems eject 100% of the build material used to create the desired product instead of only ejecting the binder and/or ink used to shape the build material. However, even though such a system is depositing the material for the desired product as well as the colorant, the size of the drops of deposit material can be varied to accomplish a smoother surface in exactly the same manner as described above in a powder and binder system.

Consequently, the principles described herein can be incorporated into any solid freeform fabrication systems that use drops to bind a build material, or drops that are the build material itself, to create cross-sectional layers of an object. It is intended that the scope of the invention be defined by the following claims.

What is claimed is:

1. A method of producing an object through solid freeform fabrication, said method comprising:
   ejecting binder drops into a bed of powder build material to form a single layer of said object; and
   ejecting binder drops of different volumes only at surface contours of said object.

2. The method of claim 1, wherein said drops further comprise ink for coloring said object.

3. The method of claim 1, wherein said drops comprise a build material.

4. The method of claim 3, wherein said drops further comprise ink for coloring said object.

5. The method of claim 1, wherein said drops of different volumes comprise small volume drops of a first volume and large volume drops of a second volume that is larger than said first volume.

6. The method of claim 5, said method further comprising interspersing small volume drops between large volume drops.

7. The method of claim 5, wherein only large volume drops are applied to an interior bulk volume of said object.

8. The method of claim 5, further comprising ejecting small volume drops at transitions between terraced layers of said object.

9. The method of claim 1, said method further comprising:
ejecting drops of a first volume with a first set of nozzles; and
ejecting drops of a second volume, larger than said first volume, with a second set of nozzles.

10. The method of claim 9, wherein said first and second sets of nozzles are interspersed on a single print head.

11. The method of claim 9, further comprising ejecting ink of different colors in drops from different nozzle groups.

12. The method of claim 10, further comprising ejecting ink in drops from said second set of nozzles only.

13. The method of claim 5, further comprising targeting small volume drops to areas between where large volume drops are deposited.

14. The method of claim 5, further comprising:
ejecting large volume drops with a first set of print nozzles;
displacing said first set of print nozzles,
positioning a second set of print nozzles; and
ejecting small volume drops with said second set of print nozzles.

15. The method of claim 1, further comprising ejecting said drops of different volumes into a layer of powdered build material.

16. The method of claim 15, further comprising ejecting drops of a first volume interspersed with drops of a second, larger volume such that said drops of said first volume reduce crater walls in said powdered build material caused by the ejection of said drops of said second, larger volume.

* * * * *